(12) United States Patent
Zhang

(10) Patent No.: US 8,641,247 B2
(45) Date of Patent: Feb. 4, 2014

(54) BACKLIGHT MODULE AND VENTILATION COMPONENT THEREOF

(75) Inventor: Pangling Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 223 days.

(21) Appl. No.: 13/379,292

(22) PCT Filed: Oct. 28, 2011

(86) PCT No.: PCT/CN2011/081464
§ 371 (c)(1),
(2), (4) Date: Dec. 19, 2011

(87) PCT Pub. No.: WO2013/056478
PCT Pub. Date: Apr. 25, 2013

(65) Prior Publication Data
US 2013/0100612 A1    Apr. 25, 2013

(51) Int. Cl.
*B60Q 1/06* (2006.01)
*F21V 29/00* (2006.01)
(52) U.S. Cl.
USPC ............. 362/373; 349/58; 361/692; 361/693; 362/97.1; 362/218; 362/294; 362/632

(58) Field of Classification Search
USPC ............. 165/104.11; 361/692, 693; 362/97.1, 362/218, 294, 373, 632; 349/58
See application file for complete search history.

(56) References Cited

U.S. PATENT DOCUMENTS 6,043,979 A * 3/2000 Shim ............................. 361/695
6,880,947 B2 * 4/2005 Hsieh et al. .................... 362/614
7,527,401 B2 * 5/2009 Chen et al. ..................... 362/373

* cited by examiner

*Primary Examiner* — Stephen F Husar
(74) *Attorney, Agent, or Firm* — Ditthavong Mori & Steiner, P.C.

(57) ABSTRACT

The present invention discloses a backlight module and a ventilation component thereof, and a back plate of the backlight module is provided with a plurality of the ventilation components. The ventilation component comprises: a tubular body, a ventilating filter, a filter washer, and a fixing ring. The tubular body is hollow, and the ventilating filter is carried in the tubular body. The ventilating filter can communicate the internal air with the external air of the backlight module circulate to effectively descend the temperature of the internal air, so that the thermal expansion of the light guide plate in the backlight module can be decreased to prevent from generating an optical problem.

19 Claims, 3 Drawing Sheets

BACKLIGHT MODULE AND VENTILATION COMPONENT THEREOF

FIELD OF THE INVENTION

The present invention relates to a backlight module, and more particularly to a backlight module having ventilation components.

BACKGROUND OF THE INVENTION

In the field of liquid crystal display (LCD) panel, a light emitting diode (LED) used as a light source of a backlight has advantages of energy saving and environment protection in comparison with a cold cathode fluorescent lamp (CCFL), so that the trend of development of the backlight is using the LED to replace the CCFL. However, the important factor influencing the development of LED is a problem of heat-dissipation. Specially, the side light type LED backlight module is violently influenced by the temperature. For optical effect, the side light type LED backlight module must keep a stable gap of light coupling between the light source and the light guide plate, but when the LED is lighted on, the air in the backlight module is heated by a heat generation of the LED, and the temperature of a light guide plate in the backlight module is quickly ascended by the heat conduction of the air.

For descending the inner temperature in the backlight module, a heat sink is generally used for dissipating the heat of the light source, but it is still unable to solve the temperature problem of the internal air in the backlight module. Besides, the developing trend of the backlight module includes design directions of ultra-thinning and narrow frame edge, and the design which only dissipates heat by the heat sink is difficult to effectively descend the inner temperature of the backlight module. Hence, the thermal expansion of the light guide plate in the backlight module is increased, so it causes an optical problem, such as a non-uniformity of backlight of display due to a surface unevenness of the light guide plate.

SUMMARY OF THE INVENTION

The primary object of the present invention is to provide a backlight module and a ventilation component thereof, so as to solve an optical problem in the tradition technologies which caused the thermal expansion of a light guide plate due to an internal air of the backlight module.

To achieve the above object, the present invention provides a ventilation component of a backlight module, which comprises:

a tubular body being hollow and defining a first thread portion located on a bottom thereof, a second thread portion located on a top thereof, and a filter supporting portion, wherein the first thread portion fixes the ventilation component onto a back plate of the backlight module; the second thread portion defines at least four opening slots; the filter supporting portion is disposed in the tubular body having at least one air vent; and a height from a support point of the filter supporting portion to a top portion of the tubular body is greater than the depth of the opening slot;

a flange portion disposed on an outer periphery between the first thread portion and the second thread portion;

a ventilating filter disposed on one side of the filter supporting portion facing toward the second thread portion;

a filter washer disposed on the ventilating filter; and a fixing ring being hollow ring-like and having an inner thread portion, wherein the diameter of the inner thread portion is slightly smaller than the diameter of the second thread portion 12, and the fixing ring is screw-connected into the second thread portion of the tubular body to fasten the ventilating filter in the tubular body;

wherein the ventilation component can communicate the internal air with the external air of the backlight module through the ventilating filter.

To achieve the above object, the present invention further provides a ventilation component of a backlight module, which comprises:

a tubular body being hollow and defining a first thread portion located on a bottom thereof, a second thread portion located on a top thereof, and a filter supporting portion, wherein the first thread portion fixes the ventilation component onto a back plate of the backlight module; the second thread portion defines at least two opening slots; the filter supporting portion is disposed in the tubular body and having least one air vent; and a height from a support point of the filter supporting portion to a top portion of the tubular body is greater than the depth of the opening slot;

a ventilating filter disposed on one side of the filter supporting portion facing toward the second thread portion;

a filter washer disposed on the ventilating filter; and a fixing ring being hollow ring-like and having an inner thread portion, wherein the diameter of the inner thread portion is slightly smaller than the diameter of the second thread portion 12, and the fixing ring is screw-connected into the second thread portion of the tubular body to fasten the ventilating filter in the tubular body;

wherein the ventilation component can communicate the internal air with the external air of the backlight module through the ventilating filter.

To achieve the above object, the present invention further provides a backlight module, and a back plate of the backlight module is provided with a plurality of the ventilation components, the ventilation component comprises:

a tubular body being hollow, and defining a first thread portion located on a bottom thereof, a second thread portion located on a top thereof, and a filter supporting portion, wherein the first thread portion fixes the ventilation component onto a back plate of the backlight module; the second thread portion defines at least two opening slots; the filter supporting portion is disposed in the tubular body and having least one air vent; and a height from a support point of the filter supporting portion to a top portion of the tubular body is greater than the depth of the opening slot;

a ventilating filter disposed on one side of the filter supporting portion facing toward the second thread portion;

a filter washer disposed on the ventilating filter; and a fixing ring being hollow ring-like and having an inner thread portion, wherein the diameter of the inner thread portion is slightly smaller than the diameter of the second thread portion 12, and the fixing ring is screw-connected into the second thread portion of the tubular body to fasten the ventilating filter in the tubular body;

wherein the ventilation component can communicate the internal air with the external air of the backlight module through the ventilating filter.

In one embodiment of the present invention, a flange portion disposed on an outer periphery of the tubular body between the first thread portion and the second thread portion.

In one embodiment of the present invention, an interior of the filter supporting portion is a rack with Y-shape or cross-shape.

In one embodiment of the present invention, the ventilating filter is a waterproof and dust-proof ventilating filter.

In one embodiment of the present invention, the ventilating filter is a circular piece, and the diameter thereof is equal or slightly greater than the hollow internal diameter of the tubular body.

In one embodiment of the present invention, the second thread portion has four of the opening slots.

In one embodiment of the present invention, the fixing ring is a hexagonal nut.

In one embodiment of the present invention, the ventilation component is disposed on a position of the back plate closed to the light bar.

Hence, the ventilation component can communicate the internal air with the external air of the backlight module circulate to effectively descend the temperature of the internal air, so that the thermal expansion of the light guide plate of the backlight module can be decreased to prevent from generating an optical problem.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
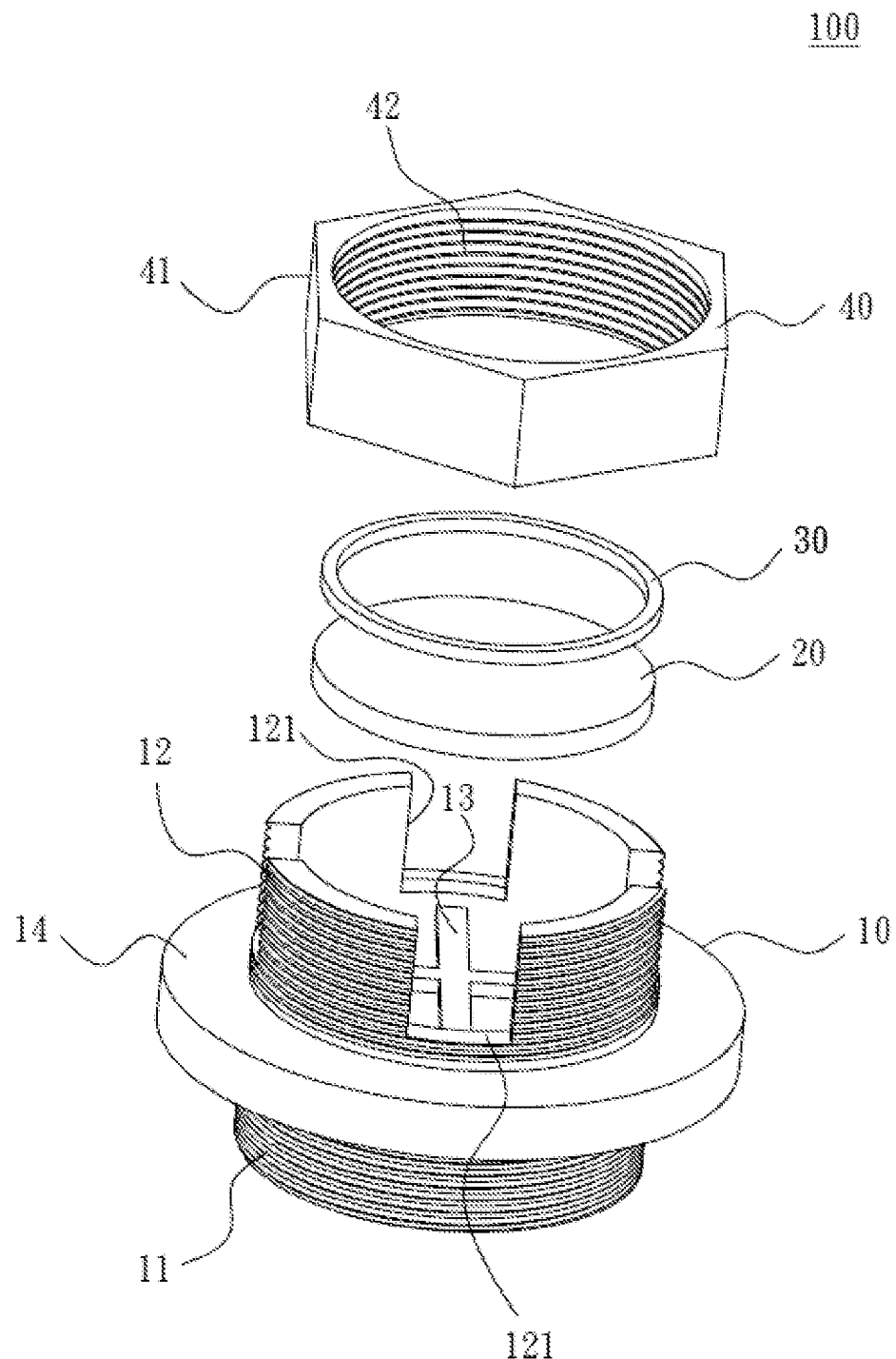
FIG. 1 is an exploded perspective view of a preferred embodiment of a ventilation component according to a backlight module of the present invention.

Referring now to FIG. 1, an exploded perspective view of a preferred embodiment of a ventilation component according to a backlight module of the present invention is illustrated in FIG. 1. As shown in FIG. 1, a ventilation component 100 of a backlight module according to the present invention comprises a tubular body 10, a ventilating filter 20, a filter washer 30, and a fixing ring 40. The tubular body 10 is hollow, and defines a first thread portion 11 located on a bottom thereof, a second thread portion 12 located on a top thereof, and a filter supporting portion 13. The tubular body 10 can be made of plastic, rubber or metal, but that are not limited thereto. Furthermore, the first thread portion 11 is used for fixing the ventilation component 100 onto a back plate of the backlight module (not shown); the second thread portion 12 defines at least two opening slots 121, which causes the second thread portion 12 having slightly permitted interior shrinkage allowance; and the filter supporting portion 13 is disposed in the hollow portion of the tubular body 10, wherein a height from a support point of the filter supporting portion 13 to a top portion of the hollow tubular body is greater than the depth of the opening slot 121, so as to carry the ventilating filter 20. Besides, the tubular body 10 selectively comprises a flange portion 14, wherein the flange portion 14 is disposed on an outer periphery between the first thread portion 11 and the second thread portion 12, so it can provide that the ventilation component 100 is against a mounting surface of the back plate of the backlight module (not shown), so as to increase the mounting stability.

As shown in FIG. 1, the number of the opening slots 121 is four, but the width, depth and number of the opening slots 121 are not limited in the present invention. The users can design the width, the depth and the number of the opening slots 121 according to an actual requirement, so that the second thread portion 12 has a suitable ability of interior shrinkage. For example, as shown in FIG. 1, the second thread portion 12 has four of the opening slots 121. Furthermore, the interior of the filter supporting portion 13 is designed as a rack with shape of cross, but the shape of the filter supporting portion 13 is not limited in the present invention. Preferably, in a situation that satisfies carrying the filter 20, the filter supporting portion 13 is provided with a ventilating cross-section area as large as possible. For example, the interior of the filter supporting portion 13 can be a rack with Y-shape.

Furthermore, the ventilating filter 20 is a waterproof and dust-proof ventilating filter. In this preferred embodiment, the ventilating filter 20 is a circular piece, and the diameter thereof is equal or slightly greater than the hollow internal diameter of the tubular body 10. The material of the ventilating filter 20 is not limited in the present invention, so it is possible to use any ventilating material. Preferably, the ventilating filter 20 is with a certain class ability of filtering the particle in the air, and with a great waterproof.

Besides, the filter washer 30 is a hollow washer with a ring-shape, and can be made of plastic or rubber; the fixing ring 40 is hollow ring. Specifically, it can be a hexagonal nut. The interior of the fixing ring 40 has an inner thread portion 42, and the diameter of the inner thread portion 42 is slightly smaller than the diameter of the second thread portion 12. Hence, when the fixing ring 40 is screw-connected into the second thread portion 12 of the tubular body 10, the opening slots 121 of the second thread portion 12 can provide a shrinkage allowance for the second thread portion 12.

Figure 2:
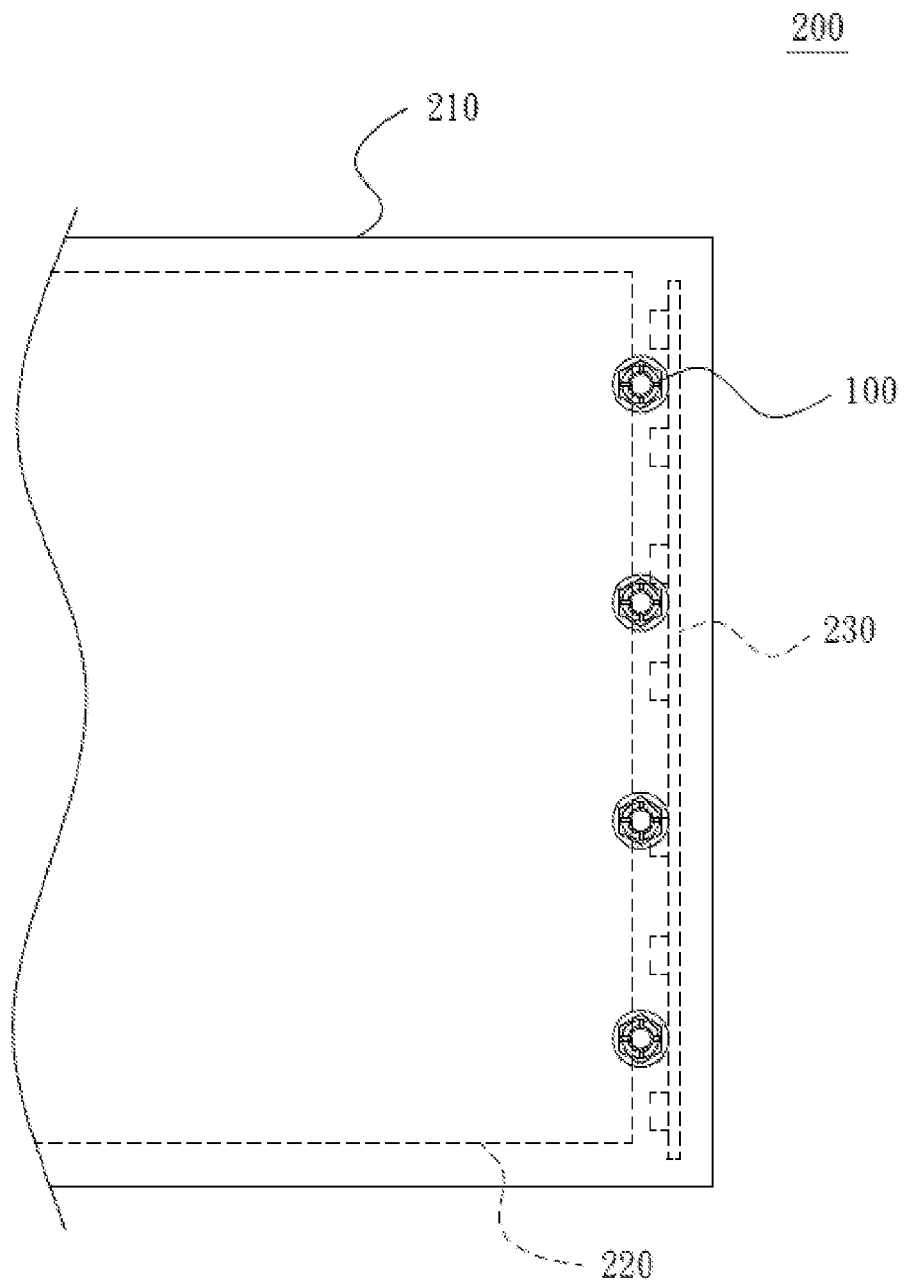
FIG. 2 is a partially schematic view according to a backlight module of the present invention.
Figure 3:
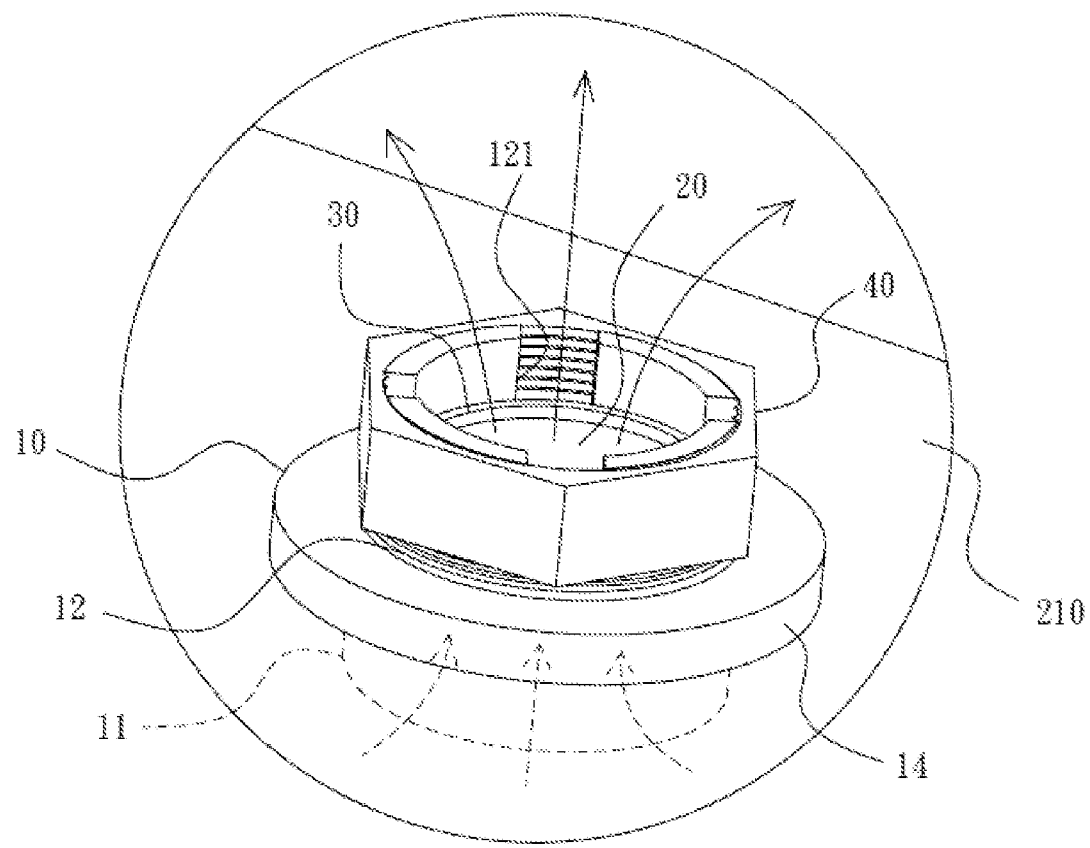
FIG. 3 is another partially schematic view according to a backlight module of the present invention.

Please referring to FIG. 2 and FIG. 3, wherein FIG. 2 is a partially schematic view according to a backlight module of the present invention; and FIG. 3 is other partially schematic view according to a backlight module of the present invention. As shown in FIG. 2, a backlight module 200 according to the present invention is mainly comprises a back plate 210, a light guide plate 220, and at least a light bar 230. The light guide plate 220 is disposed in a frame body formed by the back plate 210; the light bar 230 can be a light emitting diode (LED) light bar disposed on one side edge of the light guide plate 220, and projects a light beam toward the side edge of the light guide plate 220 to provide a light source of the backlight module 200.

In this preferred embodiment, while the backlight module 200 is assembled onto a liquid crystal display (LCD) (not shown), the light bar 230 and the light guide plate 220 are disposed in the interior of the LCD closed a sealed situation. When the light bar 230 is lighted on, the temperature of the internal air of the backlight module 200 is quick ascended. Specially, the air closed the light bar 230 is headed to a very high temperature. Therefore, the back plate 210 of the backlight module 200 according to the present invention is provided with a plurality of the ventilation components 100, and the ventilation components 100 can connect the internal air and external air of the backlight module 200, so as to quicken the heat-dissipation of the backlight module 200.

Preferably, the ventilation components 100 are disposed on a position of the back plate 210 closed to the light bar 230, and arranged along the direction of the light bar 230, so as to obtain a greater effect of heat-dissipation. The number and location of the ventilation components 100 are not limited in the present invention, and the users can layout them by actuality requirement. Furthermore, a method of installing the ventilation component 100 is description as follows.

A specific install method of the ventilation component 100 according to the present invention is as follows:

Firstly, to install the ventilating filter 20 on one side of the filter supporting portion 13 of the tubular body 10, of which side is facing toward the second thread portion 12; then to put the filter washer 30 onto the ventilating filter 20; and to turn the fixing ring 40 into the second thread portion 12 of the tubular body 10. Because the diameter of the inner thread portion 42 is slightly smaller than the diameter of the second thread portion 12, and the second thread portion 12 is provided with opening slots 121 having a interior shrinkage allowance, when the fixing ring 40 screw-connected into the second thread portion 12 of the tubular body 10, the outer periphery of the second thread portion 12 is shrunk inward, so that the inner diameter thereof is shrunk inward, too. Hence, it can press the filter washer 30 from top to bottom by turning into the fixing ring 40, so as to fasten the ventilating filter 20 on the filter supporting portion 13, and achieve the fix of the ventilating filter 20.

As shown in FIG. 3, the first thread portion 11 of the ventilation component 100 is screw-connected into a corresponding thread hole (not shown) on the back plate 210 of the backlight module 200 to fix the ventilation components 100. The ventilation components 100 can communicate two sides of the air with each other through the ventilating filter 20 (the arrows direct the flowing direction of the hot air), and the ventilating filter 20 has an ability filtering the particle in the air. Furthermore, the ventilating filter 20 has a great ability of waterproof to prevent the moisture into the backlight module 200. Hence, the ventilation components 100 make the internal air and external air circulate, then it effectively descend the inner temperature, and the thermal expansion of the light guide plate 220 of the backlight module 200 can be decreased to prevent from generating an optical problem, such as a non-uniformity of backlight of display due to a surface unevenness of the light guide plate.

Furthermore, the ventilating filter 20 can used a white surface, because the white color has a better reflecting effect, so as to increase the reflecting effect of the internal air of the backlight module 200, and to increase the light utilization. Besides, if the locations where the ventilation components 100 is disposed meet a reflecting plate or an heat-dissipation aluminum extrusion structure, the reflecting plate or the heat-dissipation aluminum extrusion structure can correspondingly open a hole, so that the first thread portion 11 of the ventilation component 100 can close a lower surface of the light guide plate 220 as possible, so as to increase the heat-dissipation effect. Furthermore, the ventilation component 100 can be attached a rubber washer between the flange portion 14 and the back plate 210, so as to enhance the sealed situation between the first thread portion 11 and the back plate 210.

As described above, by providing with a plurality of the ventilation components 100 on the back plate 210 of the backlight module 200, and the interior of the hollow tubular body 10 of the ventilation components 100 carried the ventilating filter 20, the present invention can communicate the internal air with the external air circulate to effectively descend the temperature of the internal air, so that the thermal expansion of the light guide plate 220 of the backlight module 100 can be decreased to prevent from generating an optical problem.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A ventilation component of a backlight module, characterized in that: the ventilation component comprises:
   a tubular body being hollow and defining a first thread portion on a bottom thereof, a second thread portion on a top thereof, and a filter supporting portion, wherein the first thread portion fixes the ventilation component onto a back plate of the backlight module; the second thread portion defines at least four opening slots; the filter supporting portion is disposed in the tubular body having at least one air vent; and a height from a support point of the filter supporting portion to a top portion of the tubular body is greater than the depth of the opening slot;
   a flange portion disposed on an outer periphery between the first thread portion and the second thread portion;
   a ventilating filter disposed on one side of the filter supporting portion facing toward the second thread portion;
   a filter washer disposed on the ventilating filter; and
   a fixing ring being hollow ring-like and having an inner thread portion, wherein the diameter of the inner thread portion is slightly smaller than the diameter of the second thread portion, and the fixing ring is screw-connected into the second thread portion of the tubular body to fasten the ventilating filter in the tubular body;
   wherein the ventilation component communicates the internal air with the external air of the backlight module through the ventilating filter.

2. The ventilation component of the backlight module according to claim 1, characterized in that: an interior of the filter supporting portion is a rack with Y-shape or cross-shape.

3. The ventilation component of the backlight module according to claim 1, characterized in that: the ventilating filter is a waterproof and dust-proof ventilating filter.

4. The ventilation component of the backlight module according to claim 1, characterized in that: the ventilating filter is a circular piece, and the diameter thereof is equal or slightly greater than the hollow internal diameter of the tubular body.

5. The ventilation component of the backlight module according to claim 1, characterized in that: the fixing ring is a hexagonal nut.

6. A ventilation component of a backlight module, characterized in that: the ventilation component comprises:
   a tubular body being hollow and defining a first thread portion located on a bottom thereof, a second thread portion located on a top thereof, and a filter supporting portion, wherein the first thread portion fixes the ventilation component onto a back plate of the backlight module; the second thread portion defines at least two opening slots; the filter supporting portion is disposed in the tubular body having at least one air vent; and a height from a support point of the filter supporting portion to a top portion of the tubular body is greater than the depth of the opening slot;
   a ventilating filter disposed on one side of the filter supporting portion facing toward the second thread portion;
   a filter washer disposed on the ventilating filter; and
   a fixing ring being hollow ring-like and having an inner thread portion, wherein the diameter of the inner thread portion is slightly smaller than the diameter of the second thread portion, and the fixing ring is screw-connected into the second thread portion of the tubular body to fasten the ventilating filter in the tubular body;

wherein the ventilation component communicates the internal air with the external air of the backlight module.

7. The ventilation component of the backlight module according to claim 6, characterized in that: an interior of the filter supporting portion is a rack with Y-shape or cross-shape.

8. The ventilation component of the backlight module according to claim 6, characterized in that: the ventilating filter is a waterproof and dust-proof ventilating filter.

9. The ventilation component of the backlight module according to claim 6, characterized in that: the ventilating filter is a circular piece, and the diameter thereof is equal or slightly greater than the hollow internal diameter of the tubular body.

10. The ventilation component of the backlight module according to claim 6, characterized in that: the second thread portion has four of the opening slots.

11. The ventilation component of the backlight module according to claim 6, characterized in that: the fixing ring is a hexagonal nut.

12. A backlight module, characterized in that: a back plate of the backlight module is provided with a plurality of the ventilation components, and the ventilation component comprises:
 a tubular body being hollow and defining a first thread portion located on a bottom thereof, a second thread portion located on a top thereof, and a filter supporting portion, wherein the first thread portion fixes the ventilation component onto a back plate of the backlight module; the second thread portion defines at least two opening slots; the filter supporting portion is disposed in the tubular body having at least one air vent; and a height from a support point of the filter supporting portion to a top portion of the tubular body is greater than the depth of the opening slot;
 a ventilating filter disposed on one side of the filter supporting portion toward the second thread portion;
 a filter washer disposed on the ventilating filter; and
 a fixing ring being hollow ring-like and having an inner thread portion, wherein the diameter of the inner thread portion is slightly smaller than the diameter of the second thread portion, and the fixing ring is screw-connected into the second thread portion of the tubular body to fasten the ventilating filter in the tubular body;
 wherein the ventilation component communicates the internal air with the external air of the backlight module through the ventilating filter.

13. The backlight module according to claim 12, characterized in that: the ventilation component is disposed on a position of the back plate closed to the light bar.

14. The backlight module according to claim 12, characterized in that: a flange portion disposed on an outer periphery of the tubular body between the first thread portion and the second thread portion.

15. The backlight module according to claim 12, characterized in that: the interior of the filter supporting portion is a rack with Y-shape or cross-shape.

16. The backlight module according to claim 12, characterized in that: the ventilating filter is a waterproof and dust-proof ventilating filter.

17. The backlight module according to claim 12, characterized in that: the ventilating filter is a circular piece, and the diameter thereof is equal or slightly greater than the hollow internal diameter of the tubular body.

18. The backlight module according to claim 12, characterized in that: the second thread portion has four of the opening slots.

19. The backlight module according to claim 12, characterized in that: the fixing ring is a hexagonal nut.

* * * * *